May 24, 1927.  
W. A. RIDDELL  
1,629,534  
PHOTOGRAPHIC SHUTTER  
Filed Aug. 5, 1925  
2 Sheets-Sheet 1

INVENTOR.  
William A. Riddell  
BY *[signature]*  
his ATTORNEY

May 24, 1927.

W. A. RIDDELL 1,629,534

PHOTOGRAPHIC SHUTTER

Filed Aug. 5, 1925

INVENTOR.
William A. Riddell
BY
his ATTORNEY

Patented May 24, 1927.

1,629,534

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

Application filed August 5, 1925. Serial No. 48,381.

My present invention relates to photography and more particularly to photographic shutters and it has for its object to provide an improved blade operating mechanism for pivoted blade shutters of the modern type. The improvements are directed toward an arangement whereby the master members may move idly in one direction while the shutter is being set and effectively in the other direction when the shutter is released. To these and other ends the invention resides in certain improvements and combinations of parts all as will be hereinafter more fully described, the novel features being pointed out in the claims at the end of the specification.

In the drawings.

Similar reference numerals throughout the several views indicate the same parts.

Figure 1:
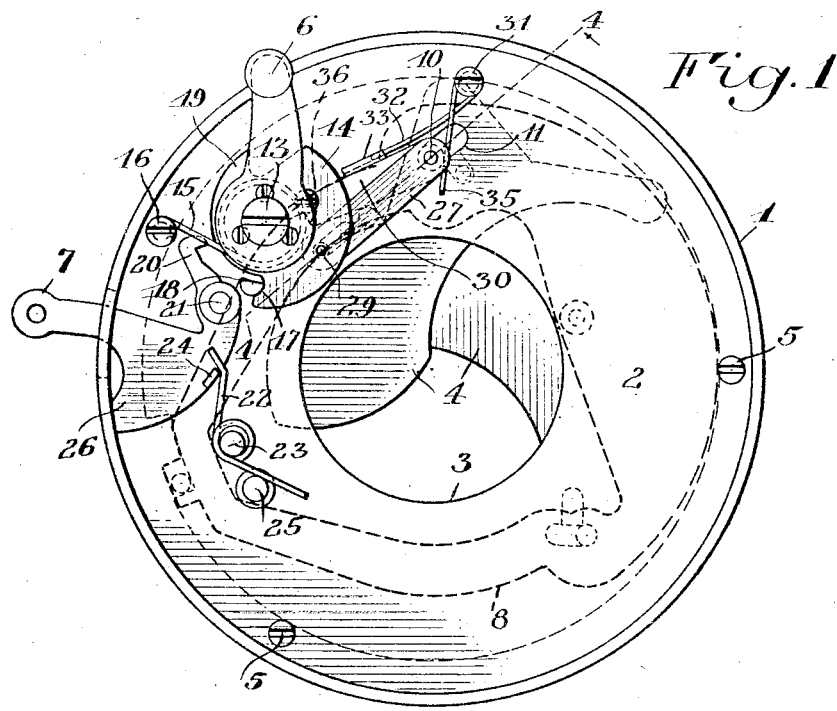
Figure 1 is a front view of the blade and operating mechanism of a shutter constructed in accordance with and illustrating one embodiment of my invention, the cover plate and all other parts being removed and the mechanism shown being in normal position with the shutter blades closed.

Referring first to the general parts of the shutter 1 indicates the usual annular casing; 2 the partition member therein provided with an exposure opening 3; 4 the blades and 5 the screws whereby the partition member 2 is secured to the bottom or back of the casing 1. A shutter of the type shown is designed for the use of three blades but only two are shown in order to simplify the disclosure. The improvements are herein illustrated in connection with a shutter of the "set" type and 6 is the setting lever projecting to the exterior of the case 1 while 7 is the operating or releasing lever also projecting to the exterior of the case 1.

The particular construction of blade mechanism to be used is immaterial and is therefore not shown with any great detail. It is sufficient to say that the blades 4 are suitably mounted to vibrate between open and closed positions in unison through their joint connection with a member 8 pivoted at 9 and adapted to oscillate between the partition member 2 and the bottom $9^a$ of the casing 1. A pin 10 on the lever 8 (which latter is shown only in dotted line) operates through a slot 11 in the partition member 2 and as it moves back and forth opens and closes the blades in a manner well known to those skilled in the art. As a matter of fact, most shutters of this type, of whatever blade construction, are designed to effect the opening and closing of the blades through the limited movement of a pin of the nature of the pin 10 and it is immaterial to this invention just what type of blade mechanism is used.

The setting lever 6, before referred to, is fastened to a drum 12 that turns on a pivot post 13 secured to the partition plate 2. Secured to the lower end of the drum 12 is a segmental plate 14. Between the latter and the lever 6 the main spring 15 of the shutter that operates the master member is coiled about the drum 12. One end is connected to the plate 14 on the drum 12 while the other end bears against a fixed post 16 on the partition plate 2. This main spring tends to turn the master member in a clockwise direction. Its normal position, with the shutter blades closed, is that of Figure 1 in which a stop 17 on one end of plate 14 engages a fixed pin 18 on the partition plate 2. When the lever 6 is moved to the left or in a counter-clockwise direction to energize the main spring 15 as in Figure 2, a catch shoulder 19 on the plate 14 is caught by a detent 20 on the operating lever 7. The operating lever 7 is pivoted at 21 and the detent 20 constitutes an extension thereof. It is normally held in a position to engage the catch shoulder 19 by a spring 22 coiled about a post 23 and having one end engaging a lug 24 on the operating member 7 while the other end acts against a fixed post 25, posts 23 and 25 being both mounted on the partition plate 2. A stop portion 26 abuts the lateral wall of the shutter casing to limit the engaging movement. It will thus be understood that during an actuation of the shutter in which the blades are opened and closed to make an exposure, the master member 6—14 moves from the set position of Figure 2 to the normal position of Figure 1 under the influence of main spring 15.

Figure 2:
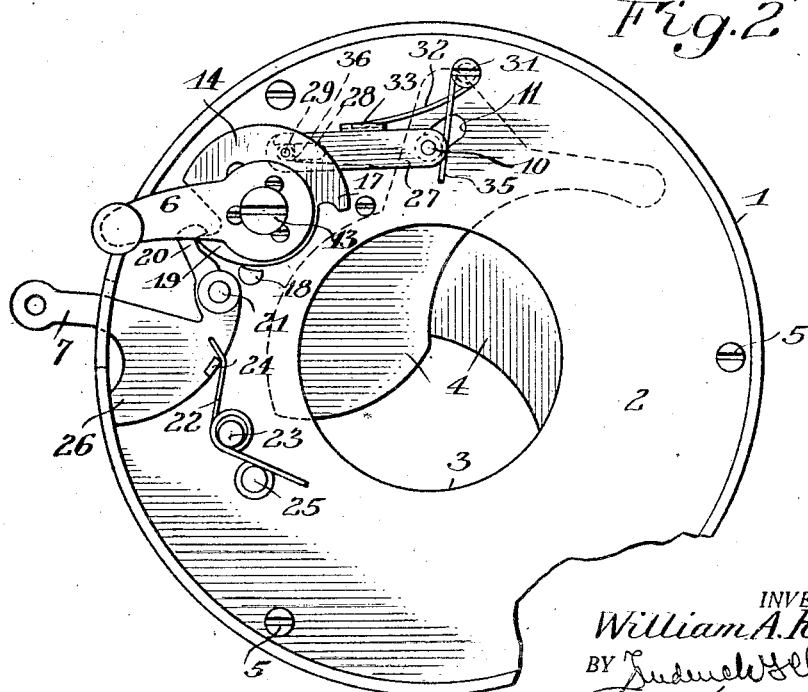
Figure 2 is a similar view with the parts in the same positions except that the master member is set.
Figure 3:
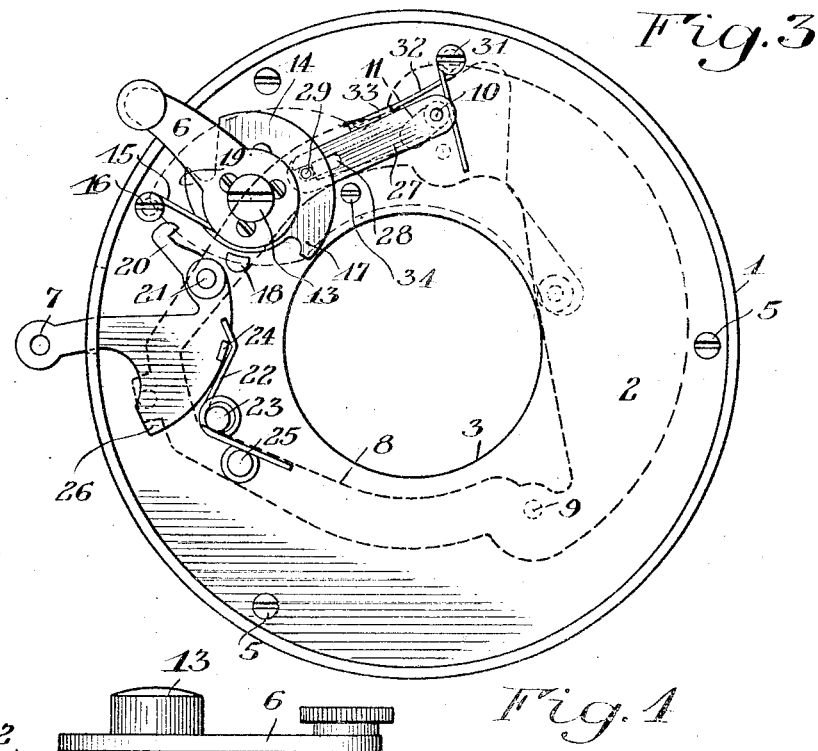
Figure 3 is a similar view showing the master member released and the shutter blades open.
Figure 4:
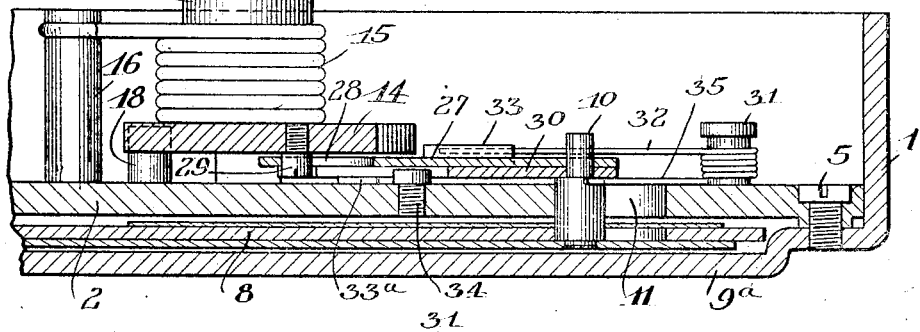
Figure 4 is an enlarged fragmentary section taken on the line 4—4 of Figure 1
Figure 5:
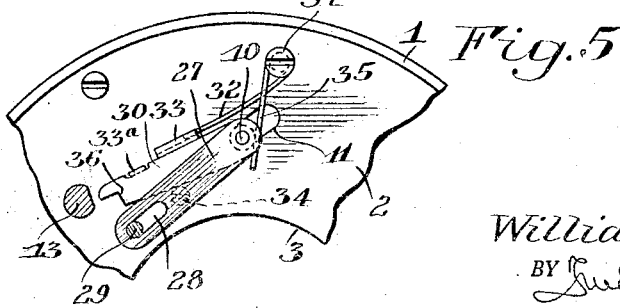
Figure 5 is a detail view of the actuator and several connected parts in the position shown in Figure 1.

The actuating mechanism which links up the master member and the blade mechanism and which is a principal feature of the present invention is constituted as follows:

A link 27 is pivoted at one end to the blade operating and controlling pin 10. Its opposite end is slotted at 28 and in this slot there operates a pin 29 on the under side of the master lever plate 14. Also pivoted on the blade pin 10 and below the link 27 is a latch member 30. A spring coiled about a fixed post 31 on the partition plate 2 has an arm 32 sliding in a grooved lug 33 on the latch 30 and tending to hold the latch 30 and the link 27 coincident. The latch 30 is provided with a lug 33ª adapted to engage the link 27 and tending to move the latter in a counter-clockwise direction until the latch is stopped by an abutment 34 on the partition plate 2 arranged below the link. The opposite end of spring 32, indicated at 35 engages the blade pin 10 between the latch 30 and the link 27 and has a normal tendency, therefore, to hold the shutter blades closed, as shown in Figures 1 and 5, the pin 10 being at the left end of slot 11 when the blades are closed. When the link 27 and latch 30 are superposed or coincident, a shoulder 36 on the latch is adapted to be engaged by the same pin 29 on the master member that operates in the slot 28 of the link. Bearing these relations of the parts in mind, the operation of the shutter is as follows:

In the normal position of Figure 1 the blades 4 are held closed by the spring arm 35. The master member 14 is in its far position to the right and against the stop pin 18. The pin 29 thereon is at the far end of the slot 28 in link 27. The latch 30 is against its stop 34 but out of engagement with the link 27. See Figure 5 also. When the setting lever 6 of the master member is moved to the left to the position of Figure 2, it is caught at 19 by the detent 20 of the operating member 7. In moving to this position, the pin 29 on the master member moves idly in the slot 28 of the link 27 and does not cause the link to move the blade pin 10 to open the blades. It does, however, move the link 27 into coincidence with the latch 30 by contacting with the latch and moving it to the position of Figure 2 wherein shoulder 36 on the latch 30 engages the pin 29. Upon depressing the operating lever 7 and releasing detent 20 from the master member upon which it has meanwhile engaged, the master member flies back in a clockwise direction under the influence of main spring 15. In so doing, its pin 29, being interlocked with shoulder 36 on the latch 30, moves both the latter and the link 27 in an endwise direction and thrusts the blade controlling pin 10 to the right in slot 11, opening the blades. Continued movement of the pin 29 in which it is carried over the center causes it to engage with the end of the slot 28 in the link 27 and close the blades. In the meantime, the pin 29 on the master member has left the shoulder 36 on the latch 30 and the latter has been stopped by the abutment 34 so that the link 27 is drawn endwise in the opposite direction and closes the blades again. The positions of Figures 1 and 5 are thus resumed and the blades are held closed by the spring at 35.

The lost motion of the master member pin 29 on the slot 28 of the link 27 thus occurs only during the setting movement and while the pin 29 of the master member is passing in one direction across a dead center. When it passes in the opposite direction across that dead center on the operative movement, it is locked by the latch 30 and hence moves both the link and the latch longitudinally and operates the blade pin 10.

I claim as my invention:

1. In a photographic shutter, the combination with blade mechanism including a blade controlling connection movable in one direction to open the blades and in the opposite direction to close them, of a master member, an actuator connecting the latter to the blade controlling connection and having a lost motion connection with the master member to permit setting movement thereof, and means for preventing lost motion between the master member and the actuator during the operating movement of the master member.

2. In a photographic shutter, the combination with blade mechanism including a blade controlling connection movable in one direction to open the blades and in the opposite direction to close them, of a master member, an actuator connecting the latter to the blade controlling connection and embodying a slotted link having a lost motion connection with the master member to permit setting movement thereof, and means for preventing lost motion between the master member and the actuator during the operating movement of the master member.

3. In a photographic shutter, the combination with blade mechanism including a blade controlling connection movable in one direction to open the blades and in the opposite direction to close them, of a master member, an actuator connecting the latter to the blade controlling connection and embodying a slotted link having a lost motion connection with the master member to permit setting movement thereof and a latch associated with the link and adapted to prevent lost motion between the master member and the actuator during the operating movement of the master member.

4. In a photographic shutter, the combination with blade mechanism including a blade controlling pin movable in one direction to open the blades and in the opposite direction to close them, of a rotary master member having a wrist pin thereon, an actuator connecting the master member to the blade controlling member and embodying a slotted link pivoted to the blade controlling pin, the wrist pin on the master member cooperating with the slotted portion of said link to move idly therein during the setting movement of the master member, and a latch also pivoted on the blade controlling pin and adapted to engage the wrist pin on the master member to open the blades during the operating movement of the master member.

5. In a photographic shutter, the combination with blade mechanism including a blade controlling pin movable in one direction to open the blades and in the opposite direction to close them, of a rotary master member having a wrist pin thereon, an actuator connecting the master member to the blade controlling member and embodying a slotted link pivoted to the blade controlling pin, the wrist pin on the master member cooperating with the slotted portion of said link to move idly therein during the setting movement of the master member as the link moves across the dead center of the latter, and to actuate the link and close the blades during the operating movement of the master member across the dead center in the opposite direction, and a latch also pivoted on the blade controlling pin and adapted to engage the wrist pin on the master member to open the blades during the initial operating movement of the master member.

WILLIAM A. RIDDELL.